(12) United States Patent
Schillheim

(10) Patent No.: US 9,333,659 B2
(45) Date of Patent: May 10, 2016

(54) DEVICE FOR SPIRAL CUTTING FRUIT AND HARD VEGETABLES

(71) Applicant: GEFU—Kuechenboss GmbH & Co. KG, Eslohe (DE)

(72) Inventor: Rudolf Schillheim, Eshohe-Wenholthausen (DE)

(73) Assignee: GEFU-Kuechenboss GmbH & Co. KG, Eslohe (DE)

( * ) Notice: Subject to any disclaimer, the term of this patent is extended or adjusted under 35 U.S.C. 154(b) by 348 days.

(21) Appl. No.: 14/020,867

(22) Filed: Sep. 8, 2013

(65) Prior Publication Data
US 2014/0165408 A1 Jun. 19, 2014

(30) Foreign Application Priority Data

Nov. 16, 2012 (DE) ...................... 20 2012 010 996 U

(51) Int. Cl.
| | |
|---|---|
| A47J 17/00 | (2006.01) |
| A23N 7/00 | (2006.01) |
| B26B 27/00 | (2006.01) |
| A47J 17/02 | (2006.01) |
| A47J 17/16 | (2006.01) |
| A23N 7/10 | (2006.01) |
| A23N 7/02 | (2006.01) |
| A47J 43/07 | (2006.01) |
| B26D 3/11 | (2006.01) |
| B26D 3/26 | (2006.01) |
| B26D 7/06 | (2006.01) |

(52) U.S. Cl.
CPC ................ *B26B 27/00* (2013.01); *A23N 7/026* (2013.01); *A23N 7/10* (2013.01); *A47J 17/02* (2013.01); *A47J 17/16* (2013.01); *A47J 43/0705* (2013.01); *B26D 3/11* (2013.01); *B26D 3/26* (2013.01); *B26D 7/06* (2013.01)

(58) Field of Classification Search
CPC ......... A23N 7/026; A23N 7/023; A23N 7/10; A47J 17/16; A47J 17/02; A47J 17/10
USPC ........... 99/505, 510, 567, 539, 540, 541, 588, 99/584; 83/431, 733, 865, 862, 672; 241/169.1, 169, 168
See application file for complete search history.

(56) References Cited

U.S. PATENT DOCUMENTS

| | | | |
|---|---|---|---|
| 2,018,932 A * | 10/1935 | Thorne | A47J 19/022 100/130 |
| 4,602,543 A | 7/1986 | Homma | |
| 4,704,959 A * | 11/1987 | Scallen | B26D 3/22 83/356.3 |

(Continued)

FOREIGN PATENT DOCUMENTS

| | | |
|---|---|---|
| EP | 2158826 A1 | 3/2010 |
| FR | 1324653 | 5/1963 |

(Continued)

*Primary Examiner* — Reginald L Alexander
(74) *Attorney, Agent, or Firm* — Friedrich von Rohrscheidt

(57) ABSTRACT

A device for spiral cutting fruit and hard vegetables like apples, radishes, carrots, beets and cucumbers, comprising: a cutting device; and a hand operated fixation and drive device for the cutting material which hand operated fixation and drive device is arranged above the cutting device, wherein a housing is configured as a can and includes a cover arranged on the housing, wherein which the fixation and drive device is supported in the cover, and wherein the cover is provided with an extension that is handle shaped and arranged at a circumference of the cover.

6 Claims, 6 Drawing Sheets

(56) References Cited

U.S. PATENT DOCUMENTS

| | | | | |
|---|---|---|---|---|
| 5,089,286 A | * | 2/1992 | Geissler | A47J 25/00 426/512 |
| 5,216,031 A | * | 6/1993 | Dobson | B26D 3/22 83/865 |
| 6,302,014 B1 | * | 10/2001 | Kuan | A47J 43/1018 241/169.1 |
| 6,676,052 B2 | * | 1/2004 | Wu | A47J 42/04 241/169.1 |
| 8,136,443 B2 | * | 3/2012 | Lee | A47J 9/002 83/859 |
| 8,596,192 B2 | * | 12/2013 | Hauser | B26D 3/283 99/537 |

FOREIGN PATENT DOCUMENTS

| | | |
|---|---|---|
| FR | 1505066 | 12/1967 |
| GB | 2114876 A | 9/1983 |

* cited by examiner

DEVICE FOR SPIRAL CUTTING FRUIT AND HARD VEGETABLES

RELATED APPLICATIONS

This application claims priority from and incorporates by reference German patent application DE 20 2012 010 966.0, filed on Nov. 16, 2012.

FIELD OF THE INVENTION

The invention relates to a device for spiral cutting fruit and hard vegetables like apples radishes, carrots, beets and cucumbers including a cutting device attached in a housing and a manually operated fixation and drive device for the cutting material arranged above the cutting device.

BACKGROUND OF THE INVENTION

A device of this general type is not known from printed documents, however, reference is made to an image of a device of this type which is included in the drawing figures.

The advantageous device for spiral cutting fruit and hard vegetables includes a cutting portion with an adjustable julienne blade, a receiving pan disengageably arranged thereunder and a bell shaped cover in which a hand actuatable fixation device of the drive device is arranged.

It is a disadvantage that the usability of this known device is impaired by its lack of an ergonomic configuration.

BRIEF SUMMARY OF THE INVENTION

Thus, it is an object of the invention to improve a device for spiral cutting fruit and hard vegetables according to the art recited supra so that usability and in particular ergonomics are significantly improved.

The object is achieved by A device for spiral cutting fruit and hard vegetables like apples, radishes, carrots, beets and cucumbers, comprising: a cutting device; and a hand operated fixation and drive device for the cutting material which hand operated fixation and drive device is arranged above the cutting device, wherein a housing is configured as a can and includes a cover arranged on the housing, wherein which the fixation and drive device is supported in the cover, and wherein the cover is provided with an extension that is handle shaped and arranged at a circumference of the cover.

The device according to the invention has a substantial ergonomic advantage in that the handle arranged at the cover which is firmly placed on the housing can in operating condition facilitates holding the device very well with one hand and the cutting material can be rotated very easily with the other hand. The configuration according to the invention significantly simplifies using the device and substantially reduces the force required to operate the device.

Additionally the cover is pivotably linked at the housing can in another embodiment of the invention which increases the stability of the device in particular in operating condition.

Another improvement of the compactness of the device according to the invention is achieved in that the handle shaped extension of the cover extends into a centering device arranged at the housing can in closed-/operating condition.

Thus, and in particular also through an additional embodiment in which the extension arranged at the housing can is configured as a half shell and the handle shaped extension arranged at the cover is essentially completely received by the half shell extension, the cover blends into the overall device in closed and operating condition in a harmonic manner and almost without clearance. This significantly improves stability of the overall device.

In another advantageous embodiment of the invention the housing can is formed by a base element receiving the cutting products, a center element provided with a cutting device and a top element including the cover, wherein the top element and the center element are permanently connected and the base element is disengageably arranged thereon. In this embodiment it is advantageous on the one hand side that the cutting device attached at the center element is permanently arranged at the top element since this provides a stable connection of the cutting device with the overall device and on the other hand side it is advantageous that the base element that easily receives the cutting products can be disengaged from the device. The connection can be provided for example through a bayonet closure.

Last not least another advantageous embodiment of the invention includes a fixation and drive device which is disengageably arranged at the cover for better cleaning. In this embodiment the drive axle for the fixation device which reaches through the cover is disengageable from the drive crank in a simple manner so that disassembly can be performed before inserting the device for example into a dishwasher. Additional advantages from the invention can be derived from the subsequent description of an embodiment with reference to drawing figures:

BRIEF DESCRIPTION OF THE DRAWINGS

Further details, features and advantages of the invention can be derived from the subsequent description of embodiments with reference to associated drawing figures, wherein.

DETAILED DESCRIPTION OF THE INVENTION

Figure 1:
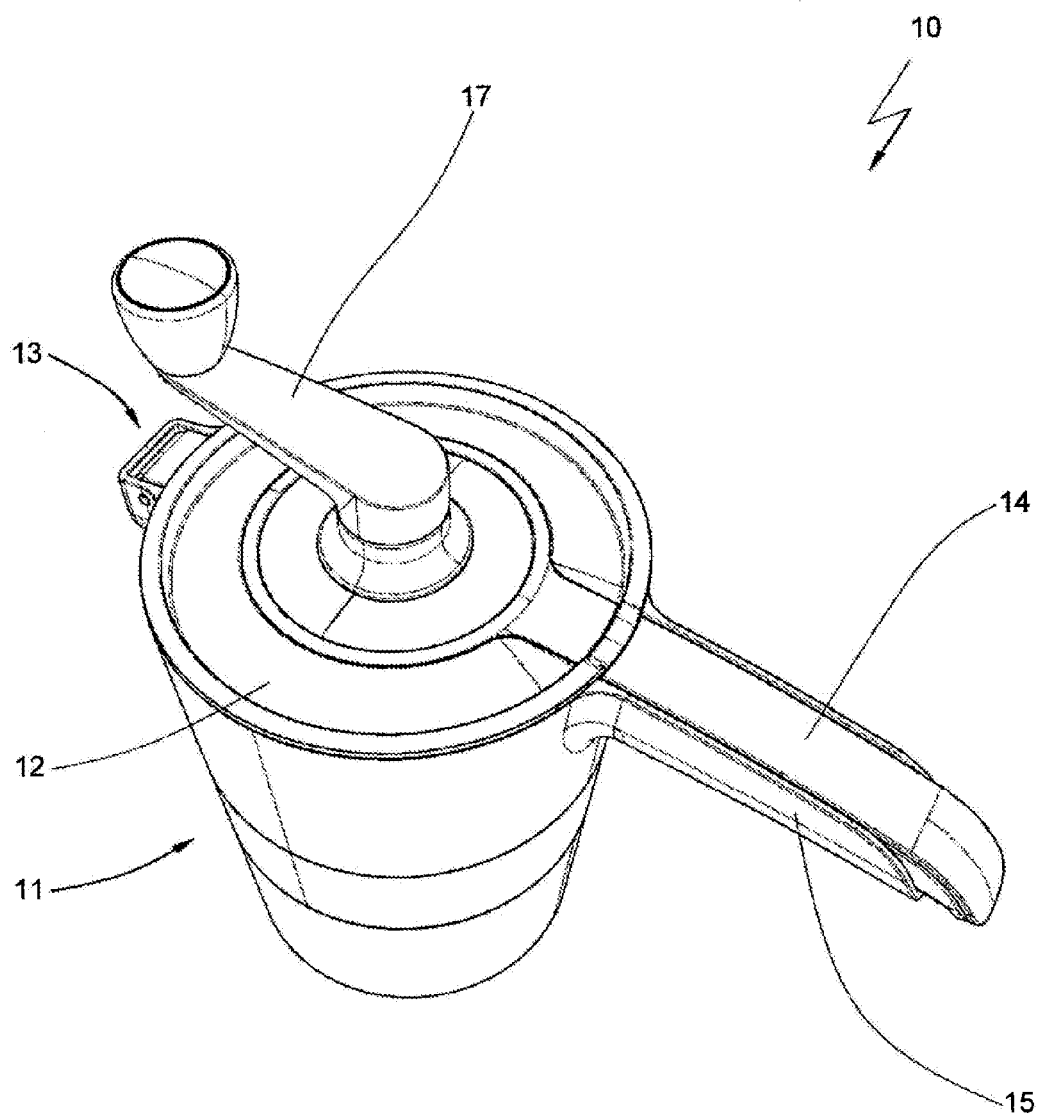
FIG. 1 illustrates a perspective view of a device for spiral cutting fruit and hard vegetables.
Figure 2:
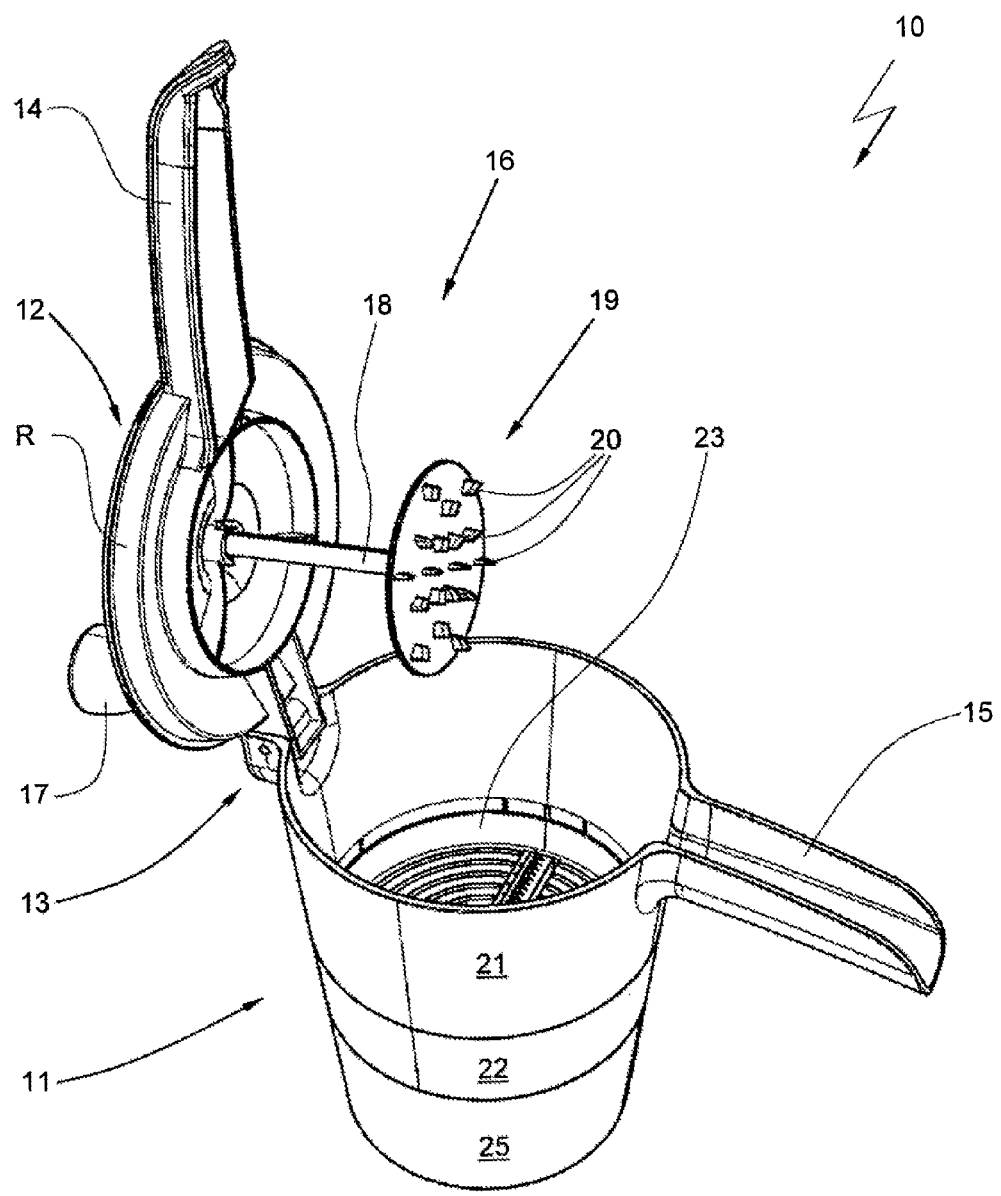
FIG. 2 illustrates a perspective view of the device according to FIG. 1 in open condition.
Figure 3:
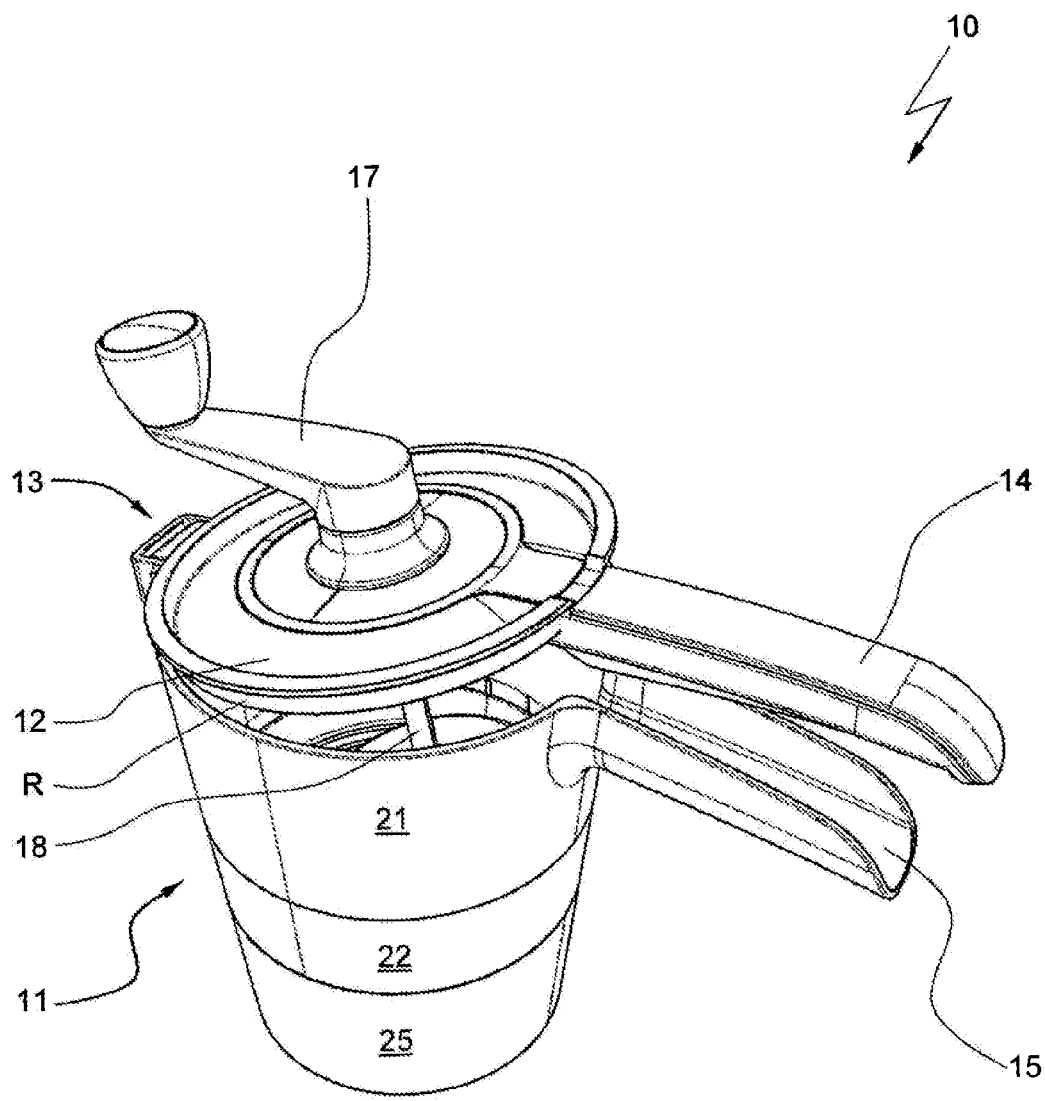
FIG. 3 illustrates a perspective view of the device according to FIG. 1 in partially closed condition.
Figure 4:
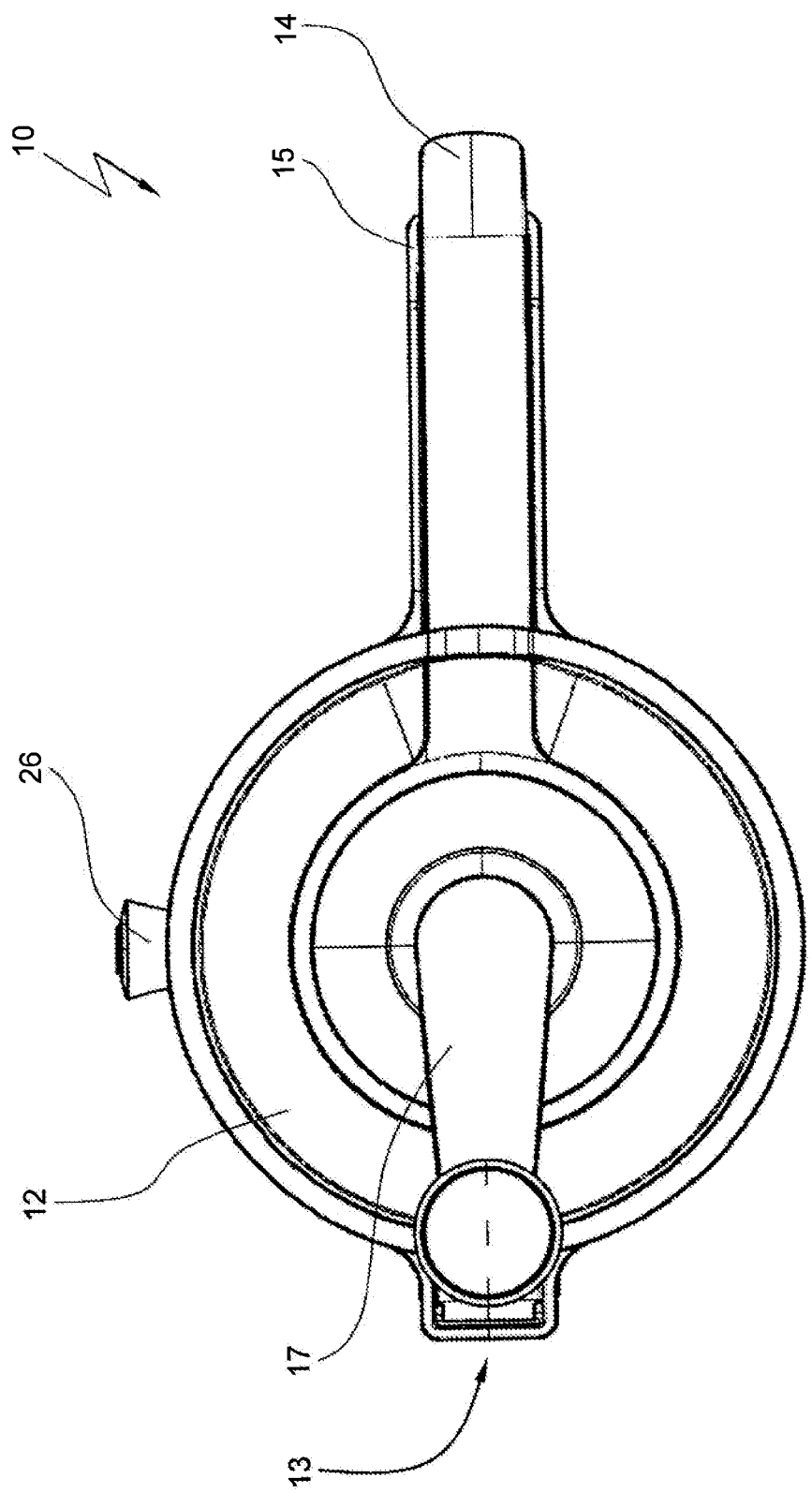
FIG. 4 illustrates a top view of the device according to FIG. 1 in closed condition.

The drawings illustrate a device 10 for spiral cutting fruit and hard vegetables.

A device of this type includes a housing can 11 with a cover 12 which is connected through a pivot link 13 with the housing can 11. The cover 12 is configured as an insertion cover at its base and includes an annular rib R through which the cover 12 is arranged in the housing can 11 in a form locking manner.

A handle 14 is arranged at the cover 12, wherein the handle extends into a centering device 15 in closed and operating condition which centering device is configured as a half shell and arranged at the housing can 11. Thus, the cover 12 is fixated additionally opposite to the link 13 closed and operating condition.

Furthermore a hand operated fixation and drive device 16 for the non illustrated cutting material is arranged in the cover 12. This fixation- and drive device is formed by a hand operated drive crank 17 and a drive axle 18 which is supported in the cover and a fixation device 19 for the cutting material. The fixation device 19 includes numerous protrusions 20 which are provided for penetrating the cutting material and for providing a fixation of the cutting material.

For simpler cleaning of the device it is possible to separate the fixation and drive device 16 from the cover 12 in that the hand crank 17 and the drive axle 18 are disengaged from one another.

The housing can 11 is configured in three elements. It includes a top element 21 with a half shell extension 15 arranged thereon, a center element 22 with a cutting plane 23 in which a cutting device 24 is arranged and a base element 25 disengageably arranged there under through a bayonet closure, wherein the cutting material falls into the base element. The center element 22 that is provided with the cutting device 24 is permanently arranged at the top element 1.

Figure 5:
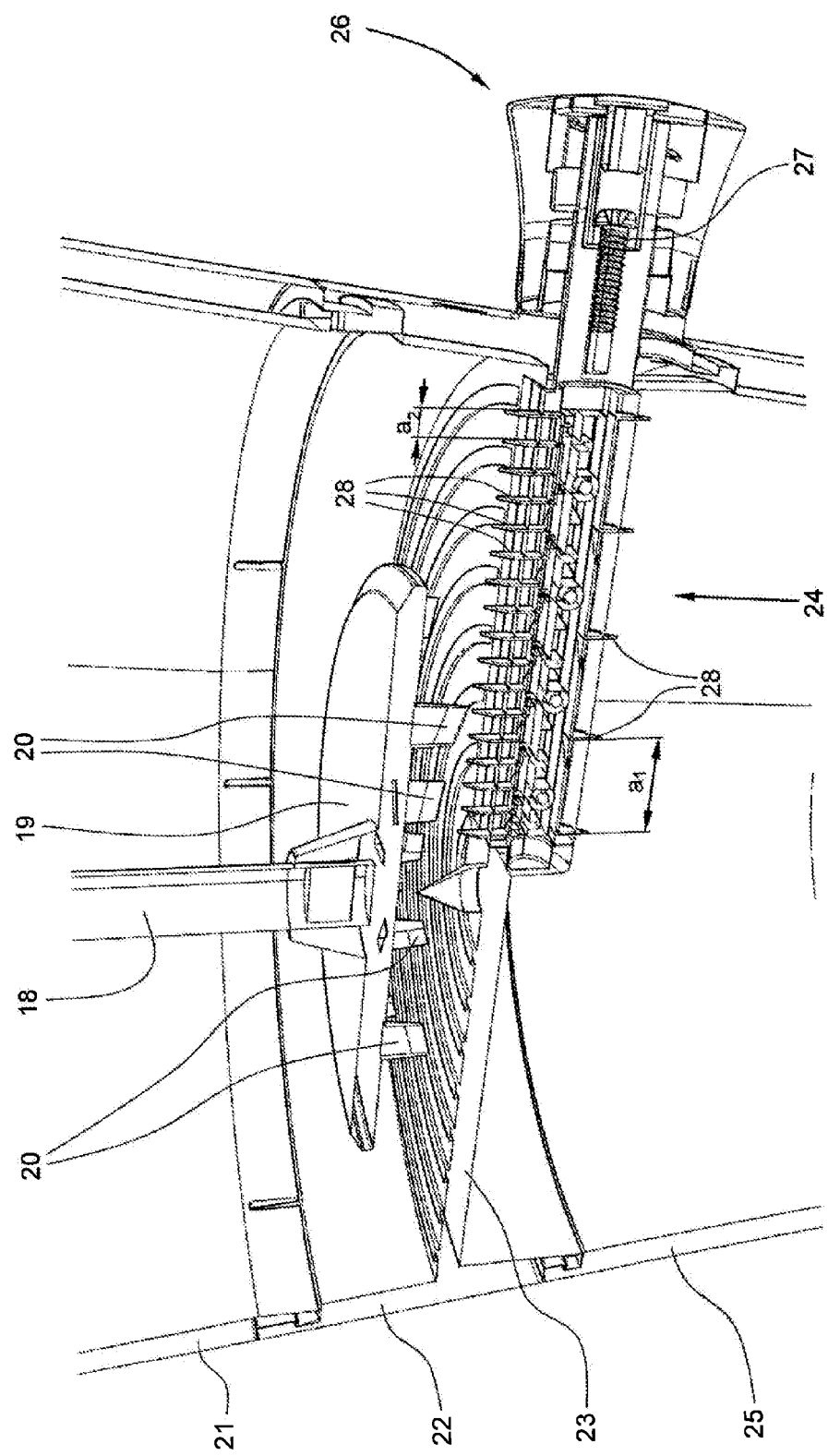
FIG. 5 illustrates a partial sectional view of a device according to FIG. 1 in the portion of the cutting device.
Figure 6:
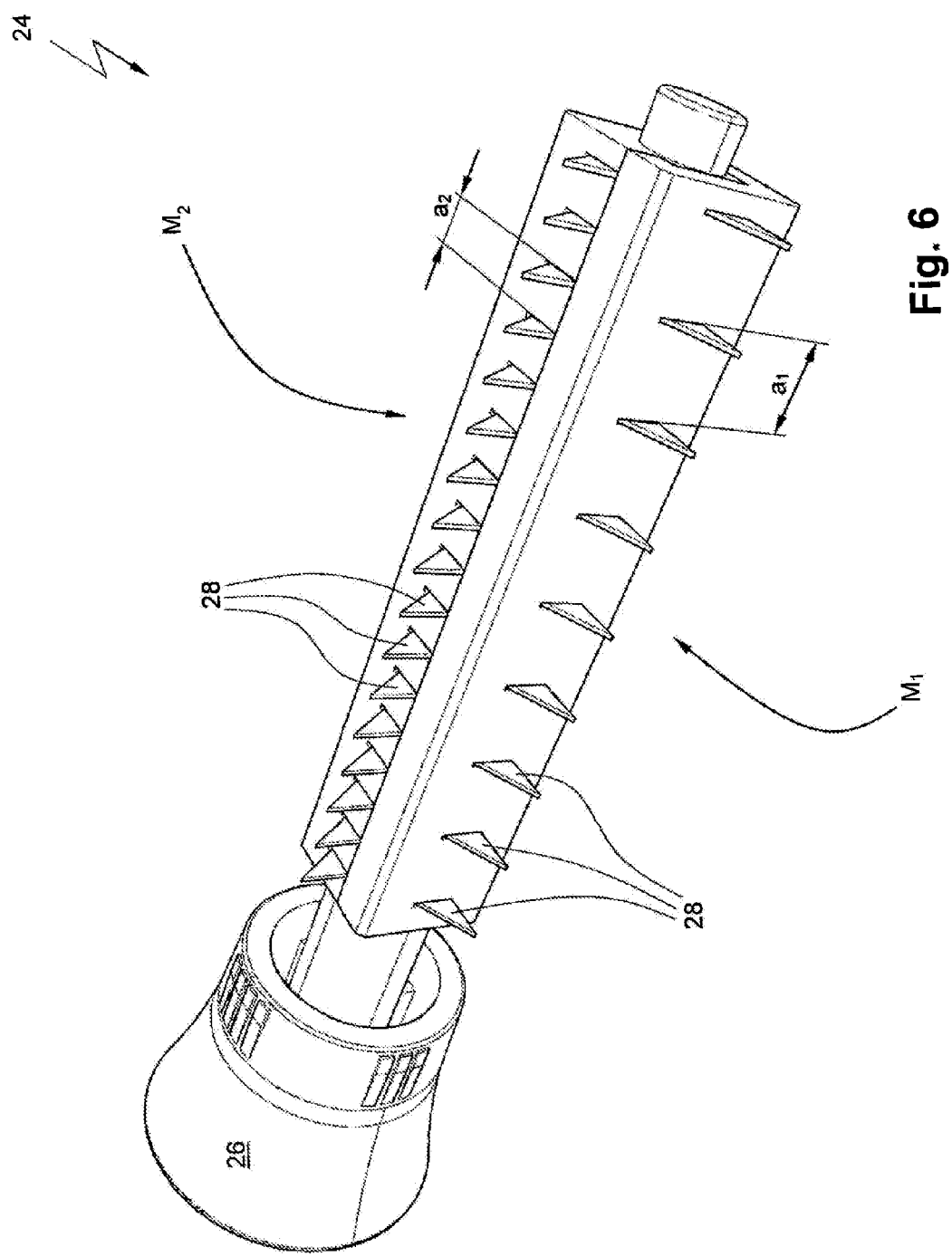
FIG. 6 illustrates an enlarged depiction of the cutting device.

The cutting device 24 which is formed by two adjustable Julienne blades $M_1$, $M_2$ in the instant embodiment is illustrated in particular in FIGS. 5 and 6. The cutting device 24 is arranged in the portion of the cutting plane 23 at the center element 22 so that it is adjustable through a turning knob 26 arranged at an outside of the housing can 11 or disengageable through a bolt 27. The turning knob 26 can be provided with a pull-rotation mechanism that is not illustrated. This means that the turning knob 26 is pulled from an interlocked position against a spring force and locked again in another cutting position after a rotation of for example 90°.

The cutting device 24 includes three different Julienne blades wherein only the Julienne blades $M_1$ and $M_2$ with different distances $a_1$, $a_2$ are visible between individual cutting elements 28 in FIG. 5. The cutting elements 28 extend from the cutting plane 23 in a direction of the cover 12.

A cutting material that is formed for example from fruit or hard vegetables and not illustrated and which is placed from above into the housing can 11 onto the cutting plane 23 can be initially spiked by the fixation protrusions 20 of the fixation and drive device 16 when closing the cover 12 and can then be put into rotation by rotating the hand crank 17. When rotating the cutting material Julienne cutting strips are automatically cut out from the cutting material, wherein the Julienne strips fall into the base element. After cutting up most of the cutting material the residual cutting material can be removed and new cutting material can be inserted. At the same time the base element 25 can be removed from the device 10 and the cutting material is available for subsequent use.

REFERENCE NUMERALS AND DESIGNATIONS 10 device
11 housing can
12 cover
13 pivot link
14 handle
15 centering device
16 fixation and drive device
17 drive crank
18 drive axle
19 fixation device
20 fixation protrusion
21 top element
22 center element
23 cutting plane
24 cutting device
25 base element
26 turning knob
27 bolt
28 cutting element
$M_1$ Julienne blade
$M_1$ Julienne blade
$a_1$ distance from 28
$a_2$ distance from 28
R annular rib at 12

What is claimed is:

1. A device for spiral cutting fruit and hard vegetables, comprising:
    a cutting device; and
    a hand operated fixation and drive device for a cutting material which hand operated fixation and drive device is arranged above the cutting device,
    wherein a housing is configured as a can and includes a cover arranged on the housing,
    wherein which the fixation and drive device is supported in the cover,
    wherein the cover is provided with an extension that is configured as a handle and arranged at a circumference of the cover, and
    wherein a centering device arranged at the housing can is configured as a half shell and receives the handle arranged at the cover substantially completely.

2. The device according to claim 1, wherein the cover is arranged at the housing can.

3. The device according to claim 1, wherein the handle at the cover extends into a centering device arranged at the housing can in closed operating condition.

4. The device according to claim 1,
    wherein the housing can includes
    a base element receiving cutting products,
    a center element provided with the cutting device and
    a top element including the cover,
    wherein the top element and the center element are permanently connected, and
    wherein the base element is disengageably arranged at the center element.

5. The device according to claim 1, wherein the fixation and drive device is disengageably arranged at the cover for better cleaning.

6. The device according to claim 1,
    wherein the cutting device is formed from a plurality of Julienne blades for different cutting widths,
    wherein the Julienne blades are adjustably arranged in a cutting plane.

* * * * *